(12) United States Patent
Jellema et al.

(10) Patent No.: US 11,399,556 B2
(45) Date of Patent: Aug. 2, 2022

(54) STEAM TREATMENT APPARATUS

(71) Applicants: Solutherm Beheer B.V., Oss (NL);
Orangeworks B.V., Mill (NL)

(72) Inventors: Pieter Jellema, Oss (NL); Jelle Luutzen Nijdam, Oss (NL)

(73) Assignees: SOLUTHERM B.V., Oss (NL);
ORANGEWORKS B.V., Oss (NL)

( * ) Notice: Subject to any disclaimer, the term of this patent is extended or adjusted under 35 U.S.C. 154(b) by 30 days.

(21) Appl. No.: 16/314,795

(22) PCT Filed: Jul. 4, 2017

(86) PCT No.: PCT/NL2017/050444
§ 371 (c)(1),
(2) Date: Jan. 2, 2019

(87) PCT Pub. No.: WO2018/009062
PCT Pub. Date: Jan. 11, 2018

(65) Prior Publication Data
US 2019/0200652 A1  Jul. 4, 2019

(30) Foreign Application Priority Data
Jul. 4, 2016  (NL) .................................. 2017097

(51) Int. Cl.
*A23L 5/10* (2016.01)
*A23L 3/04* (2006.01)
(Continued)

(52) U.S. Cl.
CPC ............... *A23L 5/13* (2016.08); *A23K 40/00* (2016.05); *A23K 40/25* (2016.05); *A23K 50/48* (2016.05);
(Continued)

(58) Field of Classification Search
None
See application file for complete search history.

(56) References Cited

U.S. PATENT DOCUMENTS 4,155,293 A * 5/1979 Spiel .......................... A23L 5/13
99/352
4,556,572 A * 12/1985 Kaufman, Jr. ........... A21B 3/04
426/289

(Continued)

FOREIGN PATENT DOCUMENTS

EP         1163855 A1   12/2001
GB         264278       1/1927
(Continued)

OTHER PUBLICATIONS

International Preliminary Report on Patentability dated Jan. 8, 2019 issued in corresponding International Patent Application No. PCT/NL2017/050444.

(Continued)

*Primary Examiner* — Ibrahime A Abraham
*Assistant Examiner* — Elizabeth M Sims
(74) *Attorney, Agent, or Firm* — Pillsbury Winthrop Shaw Pittman, LLP

(57) ABSTRACT

Apparatus and method for treating a product with steam. The apparatus includes a treatment tunnel having an entrance opening and an exit opening for introducing and discharging the product, respectively. The apparatus includes a transport unit for transporting the product from the entrance opening to the exit opening and a steam feed unit for feeding steam into the treatment tunnel. The apparatus includes one or more nozzles in communication with the steam feed unit arranged for directing a jet of steam at the product.

24 Claims, 2 Drawing Sheets

(51) Int. Cl.
*A23N 17/00* (2006.01)
*A23K 50/48* (2016.01)
*A23K 40/25* (2016.01)
*A23L 3/18* (2006.01)
*A23K 40/00* (2016.01)

(52) U.S. Cl.
CPC ............... *A23L 3/04* (2013.01); *A23L 3/185* (2013.01); *A23N 17/004* (2013.01); *A23N 17/005* (2013.01)

(56) References Cited

U.S. PATENT DOCUMENTS

| | | | | |
|---|---|---|---|---|
| 5,410,951 | A | * | 5/1995 | Ledet ................ A23L 3/185 99/443 C |
| 5,766,002 | A | * | 6/1998 | Silvestrini ............ A23L 3/362 432/121 |
| 5,852,882 | A | * | 12/1998 | Kendall ................ F26B 11/181 34/599 |
| 6,572,911 | B1 | | 6/2003 | Corcoran et al. |
| 6,629,493 | B1 | | 10/2003 | Schaible, II et al. |
| 8,524,299 | B2 | | 9/2013 | Brent, Jr. |
| 2003/0207006 | A1 | | 11/2003 | Jurgensen et al. |
| 2006/0233937 | A1 | | 10/2006 | Nassar et al. |
| 2012/0201946 | A1 | * | 8/2012 | Fukumori ............ A23L 7/196 426/627 |
| 2014/0328990 | A1 | * | 11/2014 | Molnar ............ A47J 37/0688 426/523 |
| 2017/0013991 | A1 | * | 1/2017 | Howard ................ A21B 3/04 |

FOREIGN PATENT DOCUMENTS

| | | |
|---|---|---|
| IE | 990687 A1 | 2/2001 |
| RU | 2267970 C2 | 1/2006 |
| WO | 2017/081214 A1 | 5/2017 |

OTHER PUBLICATIONS

International Search Report PCT/NL2017/050444 dated Sep. 13, 2017.
Jyeshtharaj B. Joshi et al., "Development of Efficient Designs of Cooking Systems. II. Computational Fluid Dynamics and Optimization", Ind. Eng. Chem. Res. 2012, 51, pp. 1897-1922.
Office Action dated Nov. 24, 2020 issued in corresponding European Patent Application No. 17737913.8 (4 pgs.).
Office Action dated Nov. 2, 2020 issued in corresponding Russian Patent Application No. 2018147343/10(079212) with English translation (14 pgs.).

* cited by examiner

STEAM TREATMENT APPARATUS

CROSS-REFERENCE TO RELATED APPLICATIONS

This is the U.S. National Stage of PCT/NL2017/050444, filed Jul. 4, 2017, which in turn claims priority to: Netherlands Application No. 2017097, filed Jul. 4, 2016, the contents of each of these applications being incorporated herein by reference in their entireties.

FIELD OF THE INVENTION

The invention relates to a steam treatment apparatus, such as an apparatus for treating a product such as a food product, e.g. an animal food product such as a wet pet food, with steam. More specifically the invention relates to a steam tunnel for treating a product with steam. More specifically the invention relates to a steam cooker.

BACKGROUND OF THE INVENTION

Wet pet food can be prepared as follows. First the raw material is made by mixing and optionally grinding ingredients such as meat, water, salt, emulsifier, etc. to a dough-like substance. The substance is extruded to ropes, normally having a diameter between 10 and 30 mm. The ropes are transported on a conveyor belt. On the conveyor belt the ropes are arranged in parallel in a direction parallel to the transport direction and are spaced from each other in a direction perpendicular to the transport direction. In a steam tunnel the ropes are heated using steam. The ropes are normally heated to an extent that the substance is firm enough to be cut. The ropes may e.g. be heated from approximately 8° C. at the entrance of the tunnel to a core temperature of 82° C. After passing through the steam tunnel the ropes are cut into chunks. The chunks are packaged in a container, such as a can. The can may be further filled with a gravy. After closure the filled containers may be sterilized.

Installations for treating the ropes with steam are known per se. Such known steam treatment installations can include a horizontal treatment tunnel with an entry end and an exit end, wherein the interior of the treatment tunnel is in communication with the environment such that the pressure prevailing in the treatment tunnel is essentially the same as ambient pressure. The known installations include a steam feed system for feeding steam into the treatment tunnel. Sometimes the installations include a controller arranged for maintaining, at least in an upper section of the treatment tunnel, a zone containing steam, e.g. on the basis of the signal from a temperature sensor. The installations include a transport system for feeding the ropes to be treated through the treatment tunnel.

Feeding the initially cold ropes into the tunnel, will cause an amount of air present near the surface of the ropes and between the ropes to be fed into the tunnel, together with the ropes. This air will gradually fill the inner volume of the tunnel. Condensing steam on the surface of the ropes causes a local volume reduction of the steam near the rope surface. This volume reduction causes a flow of steam towards the rope surface. However, if the steam inside the tunnel is mixed with air, the flow will also feed air towards the rope surface. The air fraction cannot condense at the rope surface. Further, air present near the rope surface will form a stagnant layer near the rope surface, forming a diffusion barrier for further condensation at the rope surface. This considerably slows down condensation of steam and heating of the ropes.

Further, the mass density of pure steam (at atmospheric pressure at 100° C.) is about 0.59 kg/m$^3$. The ambient air being fed into the tunnel along with the ropes has a mass density (at 25° C.) of about 1.18 kg/m$^3$, i.e. about twice as high as the mass density of the pure steam. This difference in mass density may cause stratification inside the tunnel, wherein the air is in a lower layer, i.e. near the ropes, and the steam in an upper layer, i.e. above the ropes. Hence, a layer of air may be dragged along with the ropes on the conveyor, and the steam may float above the air layer, diminishing the condensation of steam and heating of the ropes.

SUMMARY OF THE INVENTION

An objective of the invention is to provide an improved apparatus for treating a product with steam. An objective is to alleviate at least one of the above drawbacks of the known installations.

Thereto, according to the invention is provided an apparatus for treating a product with steam. The apparatus includes a treatment tunnel having an entrance opening and an exit opening for introducing and discharging the product, respectively. The apparatus includes a transport unit for transporting the product from the entrance opening to the exit opening. The apparatus includes a steam feed unit for feeding steam into the treatment tunnel. The apparatus includes one or more nozzles in communication with the steam feed unit arranged for directing a jet of steam at the product. Thereto, the nozzles can be aimed in a direction of the product. The nozzles can e.g. be positioned to direct a jet of steam downwards towards the product.

Air carried into the tunnel with the product can be blown away by the jets. This aids in stripping air from the surface of the ropes. Hence, on the one hand air is removed from the product surface, and on the other hand steam is effectively brought into contact with the product. Further, the jets can cause movement, e.g. turbulence, in the gas/vapour inside the tunnel. Hence stratification can be effectively combatted. Further, the jets can cause mixing of air carried into the tunnel with steam in the tunnel.

Optionally, the one or more nozzles are located in a section of the tunnel adjacent to the entrance opening. The nozzles can e.g. be located between 0 and 2000 mm from the entrance opening, such as between 100 and 1900 mm from the entrance opening. The nozzles can e.g. be located within the first 15% of the length of the tunnel, e.g. within the first 11%, e.g. within the first 7%.

Optionally, the one or more nozzles are arranged at a non-perpendicular angle relatively to a transport direction of the transport unit. Optionally, the one or more nozzles are aimed in a direction such that the jet of steam has at least a velocity component in a direction opposite to the transport direction of the transport unit. This enhances the ability of the jets to remove air from the product surface and/or to remove air from the tunnel. The nozzles can be aimed in a direction such that the jet of steam has at least a velocity component in a direction opposite to the transport direction of the transport unit and a velocity component in a downward direction.

Optionally, the one or more nozzles are arranged for directing a sheet of steam onto the product. Thereto the nozzles can be arranged along a line. The sheet of steam can effectively strip air from the product surface. Instead of, or in addition to, the line of nozzles, one or more slit-shaped nozzles can be used for forming a blade of steam directed towards the product.

Optionally, the apparatus includes an additional steam inlet arranged for injecting steam into the tunnel. Optionally, the additional steam inlet is not aimed directly at the product. The additional steam inlet can provide additional steam for additionally heating the product.

Optionally, the tunnel includes two or more consecutive compartments in transport direction of the transport unit. Optionally, the tunnel includes one or more separating walls separating the consecutive compartments. Optionally, the one or more separating walls include a cutout for feeding the product through the cutout through the separating wall. Optionally, the tunnel is substantially symmetrical relative to one such separating wall. Optionally, the tunnel is substantially symmetrical relative to a mid-plane of the tunnel orthogonal to its longitudinal direction.

The treatment tunnel can be subdivided into compartments in the longitudinal direction, with a separating wall suspended from the roof of the tunnel at the boundary between each two compartments. The separating wall, which allows passage of the product to be treated from the one compartment to the other compartment, for example through the cutout in the bottom of the separating wall or because the separating wall does not extend to the base of the treatment tunnel, counteracts transport of air-free steam from the one compartment to the other compartment. Such a separating wall thus enables independent control of the steam fed to the successive compartments of the treatment tunnel. Furthermore, such a separating wall contributes to further reduction of interference from the environment having an effect in the treatment tunnel.

In order further to counteract ambient influences having an effect on a first and last compartment of the treatment tunnel, or possibly the sole compartment of the treatment tunnel, it is advantageous if an entry or exit separating wall suspended from the roof of the treatment tunnel is provided at a boundary of the treatment tunnel at the entrance opening and exit opening, respectively.

Optionally, the input opening can include an input compartment that is essentially closed with respect to the environment. The input compartment can have an input passage for products. Optionally, the exit opening includes an output compartment that is essentially closed with respect to the environment. The output compartment can have an output passage for products.

Optionally, the apparatus includes an entrance suction unit arranged for sucking away air and/or steam above the product upstream of the entrance opening of the tunnel. Optionally, the entrance suction unit includes a plate extending over the transport unit at close distance to the product. The plate can e.g. be positioned at a distance of about 2-15 mm from the product. Optionally, the entrance suction unit includes a suction slit and/or a plurality of suction openings in the plate.

Optionally, the apparatus includes an exit suction unit arranged for sucking away air and/or steam above the product downstream of the exit opening of the tunnel. Optionally, the exit suction unit includes a plate extending over the transport unit at close distance to the product. The plate can e.g. be positioned at a distance of about 2-15 mm from the product. Optionally, the exit suction unit includes a suction slit and/or a plurality of suction openings in the plate.

According to an aspect the apparatus includes a first zone including the nozzles. The product enters the tunnel in the first zone. In the first zone rapid heating of the product can be effected. In the first zone removal of air from the tunnel can be effected.

According to an aspect the apparatus includes a second zone. The product on the transport system can be transported from the first zone to the second zone. In the second zone further heating of the product can be effected. Thereto, steam injected by the additional steam inlet can condense at the surface of the product.

According to an aspect the apparatus includes a third zone. The product on the transport system can be transported from the second zone to the third zone. In the third zone the product can be even further heated. Thereto steam injected from a further additional steam inlet can condense at the surface of the product. The third zone may be separated from the second zone by a separating wall. The third zone may be symmetrical to the second zone relatively to the separating wall. The third zone may be symmetrical to the second zone relatively to a mid-plane of the tunnel orthogonal to its longitudinal direction.

According to an aspect the apparatus includes a fourth zone, from which the product leaves the tunnel. The fourth zone contributes to further reduction of interference from the environment onto the atmosphere in the treatment tunnel. The fourth zone may be substantially symmetrical to the first zone relatively to the separating wall. The fourth zone may be substantially symmetrical to the first zone relatively to a mid-plane of the tunnel orthogonal to its longitudinal direction.

According to an aspect is provided a method for treating a product with steam. The method includes placing the product on a transport unit such as a conveyor belt. The method includes transporting the product into a treatment tunnel. The method includes directing one or more jets of steam onto the product. As explained, the jets aid in removing air from the product and/or in efficiently heating the product.

Optionally, the method includes directing a sheet of steam onto the product.

Optionally, the method includes injecting steam into the tunnel in addition to the one or more steam jets and/or steam sheet.

Optionally, the method includes placing the product on the transport unit in the form of one or more ropes. Optionally, the method includes extruding the product to form the one or more ropes. Optionally, the product is a food product, such as a pet food.

According to an aspect is provided a method for treating a food product, such as a pet food, with steam. The method includes placing the food product on a transport unit such as a conveyor belt. The method includes transporting the food product into a treatment tunnel. The method includes directing one or more jets of steam onto the food product. As explained, the jets aid in removing air from the product and/or in efficiently heating the product.

It will be appreciated that any of the aspects, features and options described in view of the apparatus apply equally to the methods and combination and vice versa. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
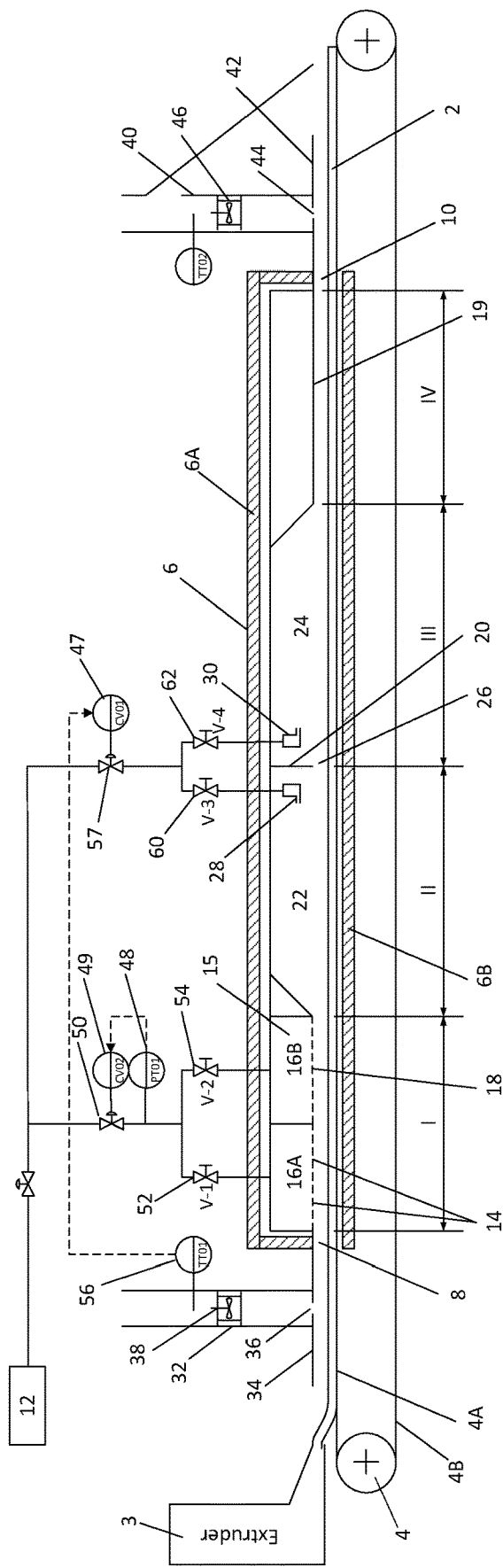
FIG. 1 shows a schematic representation of an apparatus.

FIG. 1 shows a schematic representation of an apparatus 1 for treating a product 2 with steam. In this example the product 2 is a rope of pet food substance for the preparation of wet pet food.

Wet pet food can be prepared as follows. First the raw material can be made by mixing and optionally grinding ingredients such as meat, water, salt, emulsifier, etc. to a dough-like substance by a mixing unit (not shown). The substance is extruded to ropes, normally having a diameter between 10 and 30 mm, by an extrusion unit 3. The extruded ropes are positioned onto a transport unit 4, here a conveyor belt. In the example the conveyor belt 4 is approximately 1.6 m wide. It will be appreciated that the width can be suitably chosen. On the conveyor belt 4 a plurality of ropes 2 are arranged in parallel and extending substantially axially aligned with the transport direction of the conveyor belt. On the surface of the transport unit 4 the ropes are spaced from each other in a direction perpendicular to the transport direction. A spacing between the ropes can be suitably chosen. For example, the spacing can be between 0.1-1 times a diameter of the ropes, e.g. approximately 0.25 times the diameter. In the apparatus 1 the ropes 2 are heated as will be described below. The ropes can be heated to an extent that the substance is firm enough to be cut. The ropes may e.g. be heated from approximately 8° C. upon entering of the apparatus 1 to a core temperature of about 82° C. After passing through the apparatus 1 the ropes are cut into chunks by a cutting unit (not shown). The chunks are packaged in a container, such as a can, by a packaging unit (not shown). The container may be further filled with a gravy by a filling unit (not shown). The container may be hermetically closed with a lid by a closing unit (not shown). After closure the filled containers may be sterilized by a sterilizing unit (not shown).

The apparatus 1 includes the transport unit 4 for transporting the product 2. Here the transport unit 4 extends substantially horizontally. Here the transport unit 4 includes the conveyor belt. In the example the conveyor belt 4 is approximately 1.6 m wide. It will be appreciated that the width can be suitably chosen. The conveyor belt can e.g. be made of plastic material or a metal, such as stainless steel.

The apparatus 1 includes a treatment tunnel 6. In this example the tunnel is approximately 16.8 m long. It will be appreciated that the length can be chosen suitably. In this example the tunnel 6 is formed by a cover 6A positioned over the transport unit 4. The cover 6A can include an insulation to minimize heat loss via the cover 6A. Here, the cover of the treatment tunnel 6 includes an entrance opening 8 and an exit opening 10. The entrance opening 8 allows passage of the product 2 into the tunnel 6. The exit opening 10 allows discharge of the product out of the tunnel 6. The cover 6A is positionable in a vertical direction. The cover 6A can e.g. be positioned in dependence of a dimension of the product. The cover can e.g. be positioned such that the product can just pass through the entrance opening 8 and exit opening 10. There can e.g. be a play between the product and an edge of the entrance opening and/or exit opening of about 2-15 mm.

The tunnel 6 can be closed at a lower side by a bottom 6B. Alternatively, the tunnel can be closed at a lower side by the transport unit 4. The bottom 6B can be movable relative to the cover 6A or can be fixed relative to the cover 6A. The entrance opening can allow passage of the transport unit 4, e.g. of the belt of the conveyor belt, into the tunnel 6. The exit opening can allow passage of the transport unit 4, e.g. of the belt of the conveyor belt, out of the tunnel 6. The upper, herein also termed forward, belt part 4A of the conveyor belt 4 passes through the tunnel 6. The lower, herein also termed return, belt part 4B of the conveyor belt then passes outside the tunnel 6. Hence, the tunnel 6 then forms a substantially closed chamber around the forward belt part 4A, wherein the entrance opening 8 and exit opening 10 allow free passage of the forward belt part 4A and the product 2 positioned thereon. The transport unit 4, here the upper belt part 4A, transports the product 2 through the treatment tunnel 6 from the entrance opening 8 to the exit opening 10.

The apparatus 1 includes a steam feed unit 12 for feeding steam into the treatment tunnel 6 for treating the product. The apparatus 1 includes a plurality of nozzles 14. Here the nozzles 14 are positioned in a section of the tunnel 6 adjacent to the entrance opening 8. In the example, this section extend from about 100 mm to about 1900 mm downstream of the entrance opening 8. The nozzles 14 are in fluid communication with the steam feed unit 12. In this example, the nozzles 14 are part of a nozzle unit 15. In this example, the nozzle unit 15 includes a plenum, here two plenums 16A, 16B. Steam from the steam feed unit 12 is fed into the plenums 16A, 16B. A bottom of the plenums 16A, 16B includes a nozzle plate 18 including the plurality of nozzles 14. Here the nozzles 14 are formed by bores through the nozzle plate 18.

Figure 2C:
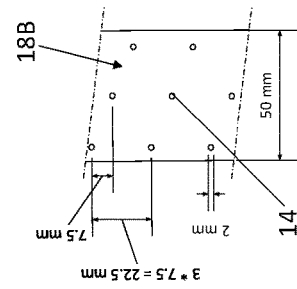
FIGS. 2A-2D shows schematic representations of a nozzle unit.
Figure 2D:
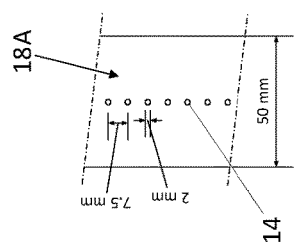
Figure 2A:
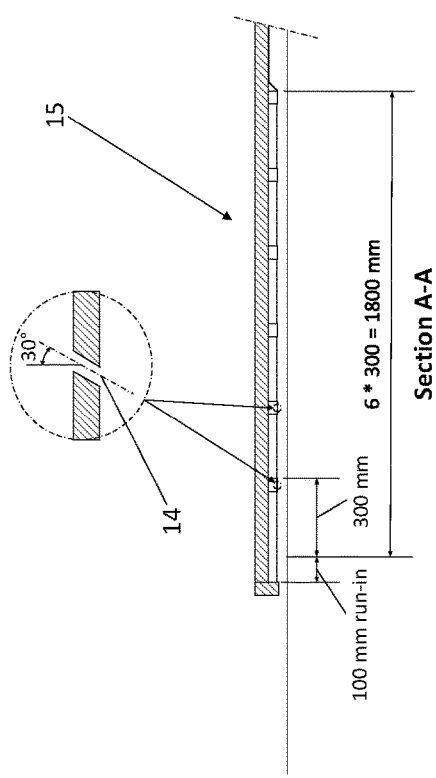
Figure 2B:
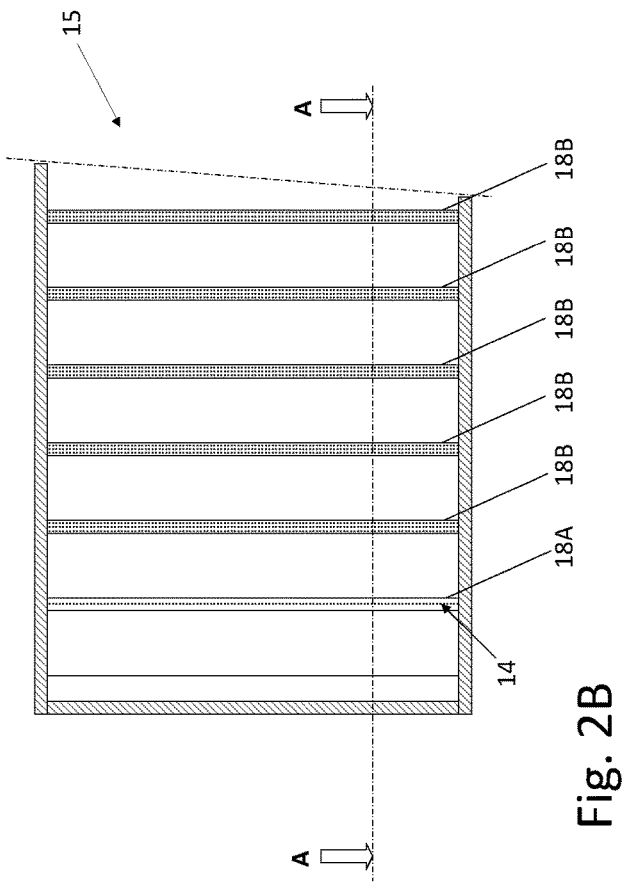

FIGS. 2A-2D show an example of the nozzle unit 15. FIG. 2A shows a schematic side view. FIG. 2B shows a schematic bottom view. Here the nozzle unit 15 includes a plurality of nozzle plate units 18A, 18B. FIG. 2C shows a schematic bottom view of the first nozzle plate unit 18A. FIG. 2D shows a schematic bottom view of the second nozzle plate unit 18B. The first, or upstream, nozzle plate unit 18A in this example includes a single line of nozzles 14. Here the nozzles 14 are spaced closely together, preferably at a pitch that is less than a diameter of the ropes. In this example the pitch is 5-10 mm, for example 7.5 mm. The nozzle diameter can e.g. be 0.5-4, mm, e.g. about 2 mm. In this example, the bores are arranged at a non-perpendicular angle relatively to the nozzle plate 18. Here the nozzles 14 are arranged at a non-perpendicular angle relatively to a transport direction of the transport unit. In this examples, the bores are arranged at an angle of about 30 degrees relative to a direction normal to the nozzle plate 18. Here, the nozzles 14 are aimed in a direction such that a jet of steam generated by a nozzle has at least a velocity component in a direction opposite to the transport direction of the transport unit. The single line of nozzles 14 forms a sheet of steam being directed onto the surface of the ropes. It will be appreciated that instead of, or in addition to, the line of nozzles, one or more slit-shaped nozzles can be used for forming a blade of steam directed towards the ropes. The second and further nozzle plate units 18B include nozzles distributed over the surface of the nozzle plate unit.

In the example of FIG. 1 the apparatus includes a separating wall 20. The separating wall 20 separates the tunnel 6 into a first compartment 22 and a second compartment 24. Hence, the tunnel 6 includes two consecutive compartments 22, 24 in transport direction of the transport unit 4. Here the separating wall 20 includes a cutout 26. The cutout 26 allows for feeding the product 2 through the cutout 26 through the separating wall 20.

The apparatus includes a first steam inlet 28. The first steam inlet 28 can e.g. be a steam lance. The first steam inlet is positioned in the first compartment 22. The apparatus includes a second steam inlet 30. The second steam inlet 30 can e.g. be a steam lance. The second steam inlet is positioned in the second compartment 24.

The apparatus 1 includes an entrance suction unit 32. The entrance suction unit 32 is arranged for sucking away air and/or steam above the product upstream of the entrance opening 8 of the tunnel 6. In this example the entrance suction unit 32 includes a plate 34. The plate 34 extends over the transport unit 4 at close distance to the product 2. The entrance suction unit 32 is movable in a vertical direction. Hence, a distance between the plate 34 and the transport unit 4, or a distance between the plate 34 and the product 2, can be set. There can e.g. be a play between the product 2 and the plate 34 of about 2-15 mm. In this example, the entrance suction unit 32 includes a suction slit 36 and/or a plurality of suction openings in the plate 34. The suction slit can e.g. have a width of 2-8 mm, e.g. approximately 5 mm. A length of the slit can e.g. substantially correspond to a width of the conveyor belt 4. Here, the entrance suction unit 32 includes a fan 38. However, it is also possible that the entrance suction unit 32 is in fluid communication with a suction line.

The apparatus 1 includes an exit suction unit 40. The exit suction unit 40 is arranged for sucking away air and/or steam above the product downstream of the exit opening 10 of the tunnel 6. In this example the exit suction unit 40 includes a plate 42. The plate 42 extends over the transport unit 4 at close distance to the product 2. The exit suction unit 40 is movable in a vertical direction. Hence, a distance between the plate 42 and the transport unit 4, or a distance between the plate 42 and the product 2, can be set. There can e.g. be a play between the product 2 and the plate 42 of about 2-15 mm. In this example, the exit suction unit 40 includes a suction slit 44 and/or a plurality of suction openings in the plate 42. The suction slit can e.g. have a width of 2-8 mm, e.g. approximately 5 mm. A length of the slit can e.g. substantially correspond to a width of the conveyor belt 4. Here, the exit suction unit 40 includes a fan 46. However, it is also possible that the exit suction unit 40 is in fluid communication with a suction line.

The apparatus 1 as described so far can be used as follows for heating the product, e.g. the ropes of substance on the carrier 4. As will be explained below, the product is treated in a zoned manner.

Cold ropes at a temperature of e.g. 8° C. are positioned on the conveyor belt 4 and are transported into the apparatus 1. The ropes are moved underneath the entrance suction unit 32 and into the tunnel 6.

Once in the tunnel, the ropes enter into a first zone I underneath the nozzles 14. In the first zone rapid heating of the ropes is effected. In the first zone removal of air from the tunnel is effected. The nozzles 14 direct jets of steam towards the surface of the ropes. Further, steam injected by the first steam inlet 28 is fed over the ropes in counter flow.

The jets cause steam to be directed to the surface of the product 2. Hence, air carried into the tunnel 6 with the ropes 2, e.g. in between the ropes, is blown away by the jets. Herein the line of jets of the first nozzle plate unit 18A forms a sheet of steam being directed onto the surface of the ropes. This aids in stripping air from the surface of the ropes. Hence, on the one hand air is removed from the rope surface, and on the other hand steam is effectively brought into contact with the ropes. The second nozzle plate units 18B cause further steam to be directed towards the ropes, and cause movement, e.g. turbulence, in the gas/vapour inside the tunnel. Hence stratification is effectively combatted. Further, the jets cause mixing of air carried into the tunnel 6 with the ropes with steam injected by the jets and injected by the first steam inlet 28. It will be noted that the steam is injected by the first inlet 28 and by the nozzles 14 in counter flow with the product transport direction in this example. Hence, the steam/air mixture is directed towards the entrance opening 8 and forced through the entrance opening 8. There the steam/air mixture is sucked away by the entrance suction unit.

The amount of steam to be supplied to the plenums 16A, 16B can be determined on the basis of a first pressure measured by a first pressure sensor 48. The measured first pressure can be used for controlling a first valve 50 using a first controller 49. The amount of steam supplied to the plenums 16A, 16B is adjusted to the amount of heat that is to be supplied to the product in the area underneath the nozzle plate 18. The amount of heat can be substantially constant regardless of a diameter of the ropes. If desired a relative flow of steam through nozzles 14 of the upstream plenum and the downstream plenum can be adjusted using a second valve 52 and/or a third valve 54.

From the area under the nozzle plate 18 the ropes enter into a second Zone II. In the second zone further heating of the ropes is effected. It will be appreciated that in the first zone I the surface of the ropes has been heated. In the second zone II heating of the entire rope, into the core, is effected. This may be achieved by conduction of heat from the surface of the ropes into the core. Thereto, steam injected by the first steam inlet 28 condenses at the surface of the ropes 2. It will be appreciated that the amount of steam injected by the first inlet 28 is the amount needed for the further heating of the ropes plus an additional amount of steam required for expulsion of air in the first zone I. The amount of steam injected by the first inlet 28 can be controlled on the basis of a first temperature measured using a first temperature sensor 56. The amount of steam injected by the first steam inlet 28 can be adjusted by a fourth valve 57 using a second controller 47.

From the second zone II, the ropes pass underneath the separating wall 20 into a third zone III. In the third zone the ropes are further heated for cooking the ropes. Thereto steam injected by the second steam inlet 30 condenses at the surface of the ropes 2. In this example, the tunnel 6 is substantially symmetrical relative to the separating wall 20. Therefore, the amount of steam injected by the second steam inlet 30 can be chosen substantially the same as the amount of steam injected by the first steam inlet 28. Fine tuning can be performed using a fifth valve 60 and/or a sixth valve 62.

The steam injected by the second steam inlet 30 is injected in cocurrent flow with the transport direction of the ropes. This steam therefore is directed towards a fourth zone IV.

The product is transported through the fourth zone IV towards the exit opening 10, underneath a closed plate 19. In this example the closed plate 19 is positioned at a similar height relative to the conveyor belt 4 as the plate 18. Hence, in this example, the tunnel 6 is substantially symmetrical relative to the separating wall 20, contributing to further reduction of interference from the environment to the atmosphere in the treatment tunnel. Downstream of the exit opening 10 the steam is sucked away using the exit suction unit 40.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the product treated in the apparatus are ropes of substance for the manufacture of pet food. It will be appreciated that also alternative products, such as alternative food products, can be treated in the apparatus.

In the examples the nozzles are formed by bores in a nozzle plate. However, other nozzles can be applied if desired. The nozzles can also be associated with steam carrying tubes.

In the examples, the tunnel includes one separating wall. However, two or more separating walls can be provided for forming more zones.

In the examples, the entrance suction unit includes a suction slit and/or a plurality of suction openings in the plate. It will be appreciated that the entrance suction unit can also include a single suction opening.

In the examples, the exit suction unit includes a suction slit and/or a plurality of suction openings in the plate. It will be appreciated that the exit suction unit can also include a single suction opening.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. Apparatus for treating a product with steam, including:
   a treatment tunnel having an entrance opening for introducing the product from outside the treatment tunnel to inside the treatment tunnel and an exit opening for discharging the product from inside the treatment tunnel to outside the treatment tunnel;
   a transport unit including a conveyor belt for transporting the product from the entrance opening to the exit opening, the conveyor belt extending through the entrance opening;
   piping connectable to a steam source for feeding steam into the treatment tunnel;
   a nozzle plate unit comprising a plurality of nozzles arranged in a section of the treatment tunnel adjacent to the entrance opening and above the conveyor belt, wherein the plurality of nozzles are formed by bores through the nozzle plate unit, wherein the bores are arranged at a non-perpendicular angle relative to a transport direction of the transport unit and in communication with the piping arranged for directing a jet of steam directly at the product, wherein the plurality of nozzles are aimed in a direction such that the jet of steam has a velocity component in a downward direction and a velocity component in a direction towards and through the entrance opening, and
   an entrance suction unit arranged for sucking away air and/or steam above the product upstream of the entrance opening of the tunnel.

2. The apparatus according to claim 1, wherein the plurality of nozzles are arranged for directing a sheet of steam onto the product.

3. The apparatus according to claim 1, further including an additional nozzle arranged for injecting steam into the tunnel.

4. The apparatus according to claim 3, wherein the additional nozzle is not aimed directly at the product.

5. The apparatus according to claim 1, wherein the tunnel includes two or more consecutive compartments in transport direction of the transport unit.

6. The apparatus according to claim 5, wherein the tunnel includes one or more separating walls separating the consecutive compartments.

7. The apparatus according to claim 6, wherein the one or more separating walls include a cutout for feeding the product through the cutout through the separating wall.

8. The apparatus according to claim 6, wherein the treatment tunnel is symmetrical relative to the separating wall.

9. The apparatus according to claim 1, wherein the entrance suction unit includes a plate extending over the transport unit at a distance of 2-15 mm from the product.

10. The apparatus according to claim 9, wherein the entrance suction unit includes a suction slit and/or a plurality of suction openings in the plate.

11. The apparatus according to claim 1, including an exit suction unit arranged for sucking away air and/or steam above the product downstream of the exit opening of the tunnel.

12. The apparatus according to claim 11, wherein the exit suction unit includes a plate extending over the transport unit at a distance of 2-15 mm from the product.

13. The apparatus according to claim 12, wherein the exit suction unit includes a suction slit and/or a plurality of suction openings in the plate.

14. The apparatus according to claim 1, wherein the plurality of nozzles are aimed in a direction such that the jet of steam has a velocity component in a downward direction and a velocity component in a direction towards and through the entrance opening for directing a steam/air mixture towards and through the entrance opening, wherein the entrance suction unit is arranged for sucking away the steam/air mixture that is forced through the entrance opening.

15. Method for treating a product with steam, including:
   placing the product on a transport unit;
   transporting the product into a treatment tunnel; and
   directing one or more jets of steam directly onto the product such that the one or more jets of steam have at least a velocity component in a downward direction and a velocity component in a direction towards and through the entrance opening, and
   sucking away air and/or steam above the product,
   wherein the treatment tunnel has an entrance opening for introducing the product from outside the treatment tunnel to inside the treatment tunnel and an exit opening for discharging the product from inside the treatment tunnel to outside the treatment tunnel, wherein the transport unit includes a conveyor belt for transporting the product from the entrance opening to the exit opening, the conveyor belt extending through the entrance opening, wherein piping is configured for connection to a steam source for feeding steam into the treatment tunnel, wherein the directing one or more jets of steam includes providing a nozzle plate unit comprising a plurality of nozzles arranged in a section of the treatment tunnel adjacent to the entrance opening and above the conveyor belt, wherein the plurality of nozzles are formed by bores through the nozzle plate unit, wherein the bores are arranged at a non-perpendicular angle relative to a transport direction of the transport unit and in communication with the piping arranged for directing a jet of steam directly at the product, wherein the plurality of nozzles are aimed in a direction such that the jet of steam has the velocity component in the downward direction and the velocity component in the direction towards and through the entrance opening, and wherein an entrance suction unit is arranged for the sucking away of the air and/or the steam above the product upstream of the entrance opening of the tunnel.

16. The method according to claim 15, including directing a sheet of steam onto the product.

17. The method according to claim 15, including injecting steam into the tunnel in addition to the one or more steam jets and/or steam sheet.

18. The method according to claim 15, including placing the product on the transport unit in the form of one or more ropes.

19. The method according to claim 18, including extruding the product to form the one or more ropes.

20. The method according to claim 18, wherein the product is a food product or a pet food.

21. The method according to claim 15, including having the product enter the tunnel in a first zone in which the one or more jets of steam are directed onto the product, for heating of the product and/or removal of air from the tunnel.

22. The method according to claim 21, including transporting the product from the first zone to a second zone of the tunnel in which additional steam is injected, for further heating of the product.

23. The method according to claim 22, including transporting the product from the second zone to a third zone of the tunnel in which additional steam is injected, for further heating of the product.

24. The method according to claim 23, including transporting the product from the third zone to a fourth zone of the tunnel from which the product leaves the tunnel, for reducing of interference from the environment onto the atmosphere in the treatment tunnel.

* * * * *